US006597697B1

(12) United States Patent
Petersen

(10) Patent No.: US 6,597,697 B1
(45) Date of Patent: Jul. 22, 2003

(54) EXTENDED AAL2 CONNECTION IDENTIFIER

(75) Inventor: Lars-Göran Petersen, Tumba (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/247,066

(22) Filed: Feb. 9, 1999

(51) Int. Cl.⁷ .................................................. H04L 12/56
(52) U.S. Cl. .................... 370/395.64; 370/474; 370/539
(58) Field of Search ................................. 370/392, 394, 370/395, 397, 398, 399, 412, 389, 409, 470, 474, 395.6, 395.64, 395.63, 395.65, 535–536, 537, 538, 539

(56) References Cited

U.S. PATENT DOCUMENTS

| 5,909,428 | A | * | 6/1999 | Saito et al. .................. 370/244 |
| 5,940,397 | A | * | 8/1999 | Gritton ........................ 370/412 |
| 5,953,339 | A | * | 9/1999 | Baldwin et al. ............. 370/230 |
| 6,041,054 | A | * | 3/2000 | Westberg ..................... 370/389 |
| 6,075,798 | A | * | 6/2000 | Lyons et al. ................. 370/474 |
| 6,148,001 | A | * | 11/2000 | Soirinsuo et al. ....... 370/395.65 |
| 6,163,542 | A | * | 12/2000 | Carr et al. ................... 370/399 |
| 6,289,016 | B1 | * | 9/2001 | Subbiah et al. .......... 370/395.3 |
| 6,317,432 | B1 | * | 11/2001 | Ono et al. ............... 370/395.2 |

FOREIGN PATENT DOCUMENTS

| GB | 2-322-515 A | 8/1998 |
| WO | WO 96/34478 | 10/1996 |

* cited by examiner

*Primary Examiner*—Hassan Kizou
*Assistant Examiner*—Saba Tsegaye

(57) ABSTRACT

A method of multiplexing a plurality of virtual channel connections into a single channel is disclosed. Each of the virtual channel connections is made up of a plurality of minicells within an AAL2 protocol. The user to user indication field of the minicell is used in addition to the connection identifier to identify each of the virtual channel connections. A method is also disclosed for demultiplexing virtual channel connections from a single channel into AAL2 minicells.

14 Claims, 6 Drawing Sheets

EXTENDED AAL2 CONNECTION IDENTIFIER

BACKGROUND

The present invention relates to the transmission of telecommunications data, and more particularly to a method of increasing the data transmitting capacity using the minicells of an asynchronous transmission mode (ATM).

ATM is a standard protocol for transmitting asynchronous telecommunications data. This protocol is based on the transmission of data in fixed size data packets known as ATM cells. Each ATM cell exhibits a singular format comprising a 48 octet payload portion and a 5 octet header portion. ATM is well known in the art.

Unfortunately, ATM does not efficiently transport low bit rate data as the length of a typical low bit rate data packet is significantly less than 48 octets (i.e., the length of an ATM cell payload). Any unused portion of an ATM cell payload is filled with "padding bits". When padding bits are inserted rather than data, bandwidth is wasted. The insertion of padding bits may also result in unacceptable transmission delays, which may be detrimental, especially when the data being transported is highly sensitive to delays, such as voice-type data.

An ATM adaptation layer, known as AAL2, has been developed for the purpose of improving the efficiency of ATM when employed to transport low bit rate data. Referring to FIG. 1, AAL2 operates by storing low bit rate data in small, variable length data packets called minicells 111 (sometimes referred to as microcells or short packets). An improvement in bandwidth utilization is achieved by inserting several minicells into the payload of a single ATM cell, such as ATM cell 121. In order to further improve bandwidth utilization, a minicell, for example minicell 131, may be segmented so that it overlaps two ATM cells as illustrated.

More recently, a new standard for carrying compressed voice on Asynchronous Transfer Mode (ATM), Recommendation I.363.2 (hereinafter I.363.2), has been approved by the International Telecommunication Union (ITU). This allows up to 255 connections to be simultaneously multiplexed on an ATM Virtual Channel Connection (VCC). The eight bit connection identifier (CID) field in the ATM Adaptation Layer type 2 Common Part Sublayer (AAL2-CPS) packet is used for this purpose. If more than these 255 AAL2 connections are desired, a new ATM-VCC is needed.

FIG. 2 illustrates an AAL2-CPS packet according to I.363.2. This packet is made up of a connection identifier (CID) field 211, a length indicator (LI) field 221, a user to user indication (UUI) field 231, a header error control (HEC) field 241 and a payload field 251.

The CID field 211 is eight bits in length, allowing up to 255 connections ranging from CID-1 to CID-255. Typically, however, only up to 248 connections are utilized. These range from CID-8 to CID-255. CID-0 is reserved for padding, i.e., if the next octet after the last octet in a previous AAL2-CPS packet is zero, then the remainder of the ATM cell is empty. In other words, if the octet where a new AAL2-CPS packet is supposed to start is zero, then the remaining octets in the ATM cell is filled with zeroes and is considered to be padding. The receiver, when it detects a zero octet where a new AAL2-CPS packet is supposed to start, disregards the remainder of the ATM cell. The LI field 221 is five bits in length and indicates the number of octets in the payload. It ranges from LI-0 to LI-44 which corresponds to payloads of 1 to 45 octets. The UUI field 231 is also five bits in length and is transparently conveyed from one end user to the other end user. That is, the user may or may not be aware of this activity; in this case, the user may or may not be aware of the UUI field being conveyed. It may be considered as a field in which the user may place any type of information as long as that information is not placed in the range of UUI-26 to UUI-31 which are reserved for segmentation and OAM usage. By limiting the segmentation and OAM to bits 26 to 31, CID expansion is facilitated according to exemplary embodiments of the present invention. The HEC field 241, also five bits in length, may be used for verifying the integrity of the AAL2-CPS packet header.

This particular number of CIDs (i.e., 255) results from the fact that the ATM multiplexing capability can be used to increase the number of AAL2 connections. However, the ATM cell header in every cell takes about 10% of the bandwidth. Therefore, for every 48 octets of payload, 5 octets are inserted. In instances where bandwidth is extremely expensive, it is economically beneficial if the AAL2-CPS packets are placed directly on the E1 or T1 time-division multiplex (TDM) lines. The number of AAL2 connections that can be indicated by the CID, however, will not be sufficient in such cases.

FIG. 3 illustrates a conventional AAL2 multiplexing technique with added resilience against loss of delineation in the form of a start octet.

The basic delineation is provided by the fixed size ATM cells 301, 302 and 303. The fact that the ATM cells come "back to back" every 53 octets makes it easy to use a receiver state machine that takes this into account. The ATM header 311 of 5 octets contains a HEC field 321 that makes it possible for the receiver to check the integrity of the ATM cell header. If the HEC matches, it is highly probable that the receiver will find the header and if the next header matches, the probability increases even further. Under normal practice, if six headers in a sequence match, the receiver is considered to be synchronized. Furthermore, due to the 53 octet length, the state machine does not have to leave the sync state at a first error in the ATM cell header. If it is repeated a predetermined number of times (e.g., six times), however, it is considered to no longer be in the synchronized state. The same technique is more difficult to apply to the AAL2 demultiplexing since the AAL2-CPS packets 391 to 397 may have variable sizes. The length indicator 351 provided in the header of each AAL2-CPS packet is used to locate the start of the next AAL2-CPS packet. The entire AAL2-CPS packet header is protected by a HEC that is similar to the one for the ATM cell. This ensures that the integrity of LI can be checked.

In addition, an offset field 323 of six binary coded bits is inserted as a first octet in the payload of every ATM cell. The offset field contains a pointer that makes it possible to find the first AAL2-CPS packet, at every new ATM cell, regardless of the length indicator value 351. The pointer is encapsulated in a start octet 331. The start octet 331 also includes a sequence number bit 325, working as a modulo-2 counter, making it possible to detect if ATM cells have been lost, single or odd. The start octet is protected by a parity bit 327. If no remaining AAL2-CPS packets exist to fill an ATM cell, the remainder is padded by inserting a zero in every octet to the end of the ATM cell.

With eight bits allocated to the CID, the indication provided by the CID as well as the number of connections simultaneously multiplexed on an ATM-VCC is limited to 255 although, typically, only 248 connections are used. What is desired, therefore, is a method for increasing the number of multiplexed connections.

SUMMARY

It is, therefore, an object of the invention to overcome the aforementioned limitations of conventional AAL2 connections for transmitting telecommunications information.

This is achieved by multiplexing a plurality ATM-VCCs into a single channel. Multiplexing a plurality of AAL2 minicells within an ATM into a VCC is known. The eight bits of the CID field of the minicell are used to identify up to 255 of these connections which have been multiplexed into one VCC. Each VCC containing AAL2 minicells is identified by a virtual channel indicator (VCI). In order to identify a plurality of ATM-VCCs that are multiplexed into a single channel, the five bits of the UUI field of the minicell are utilized to identify up to twenty five such multiplexed VCCs.

The CID field is used as an indicator for the VCC to obtain a VCI value. This indicator is used to address a VCI table containing a pointer for each VCC that is being multiplexed. The value of this pointer is added to the CID value to determine an address for looking up within a mapping table where a new CID value derived from the addition of the pointer to the CID value is stored in the UUI field.

In an alternative embodiment, a method is also disclosed for demultiplexing a plurality of ATM-VCCs from a single channel into a plurality of minicells. All information that is not part of the AAL2 minicell including padding and ATM headers is removed. The remaining information is placed in a first-in-first-out format. Using the LI field of the minicell, the boundaries of the minicells are determined. The CID and UUI fields are used to address a mapping table within which each combination of these two fields has its own entry. The new values for CID and UUI are located within this table. These values are used to determine the contents of the minicell.

BRIEF DESCRIPTION OF THE DRAWINGS

The objects and advantages of the invention will be understood by reading the following detailed description in conjunction with the drawings in which.

DETAILED DESCRIPTION

Figure 4:
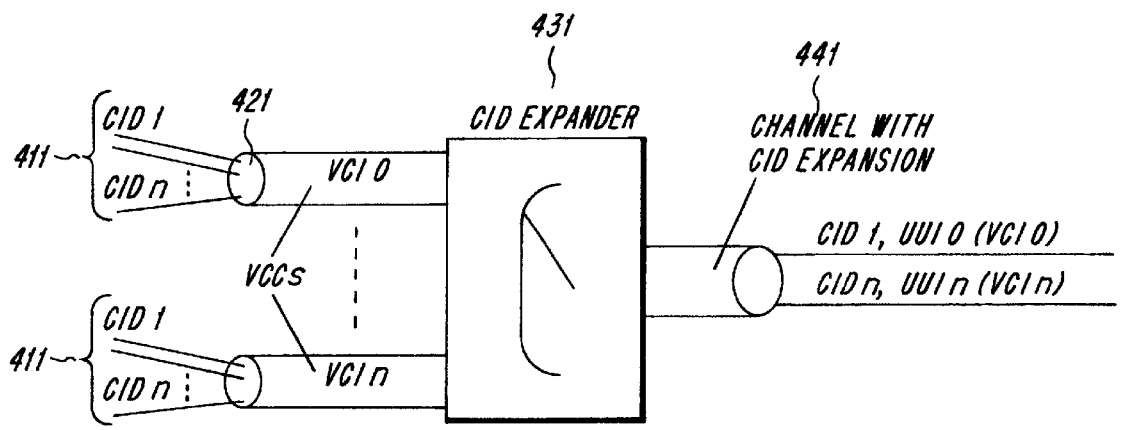
FIG. 4 illustrates a plurality of AAL2 connections being multiplexed into an ATM-VCC.

FIG. 4 illustrates a plurality of AAL2 connections 411 being multiplexed into one of a plurality of ATM-VCCs 421. Each AAL2 connection 411 is identified by its CID value. Each of the incoming VCCs 421 can be carried on a separate physical line; alternatively, a plurality of the incoming VCCs 421 can be carried on the same physical line according to known ATM techniques (not shown).

A CID expander 431 terminates a number of the VCCs 421 and assigns each VCC 421 a unique UUI code between 0 and 25. Thus, up to 26 VCCs with a full range of CIDs can be multiplexed into a single channel 441 using a CID expansion method. The channel could be a single ATM-VCC or a fractional T1 or E1 with concatenated time slots.

Figure 5:
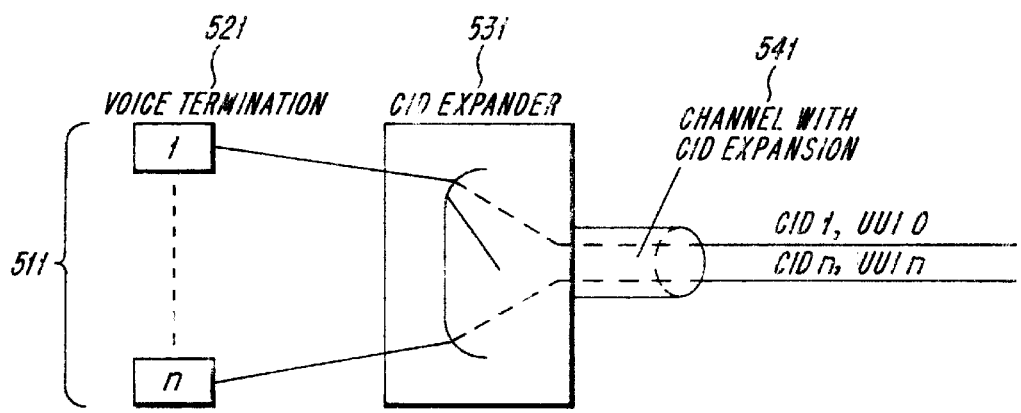
FIG. 5 illustrates an exemplary embodiment with a plurality of sources being multiplexed.

FIG. 5 illustrates an exemplary embodiment having a plurality of sources 511. Examples of such sources are voice compression equipment capable of producing AAL-2 packets each with a predefined CID in accordance with the AAL2 standard. A voice termination equipment 521 is directly multiplexed, by a CID expander 531, into a CID expansion channel 541.

In the embodiments of FIGS. 4 and 5, it is assumed that the connections are bidirectional even though only one side of the connection is illustrated. It should be noted that similar equipment must be used at the other end of the connection. If these two embodiments are combined, the voice termination equipment AAL2 connection 521 may directly be multiplexed in the channel with expanded CID on one end. At the other end, a conversion to ATM-VCC is made before the AAL2 connection reaches the voice termination equipment.

Figure 6:
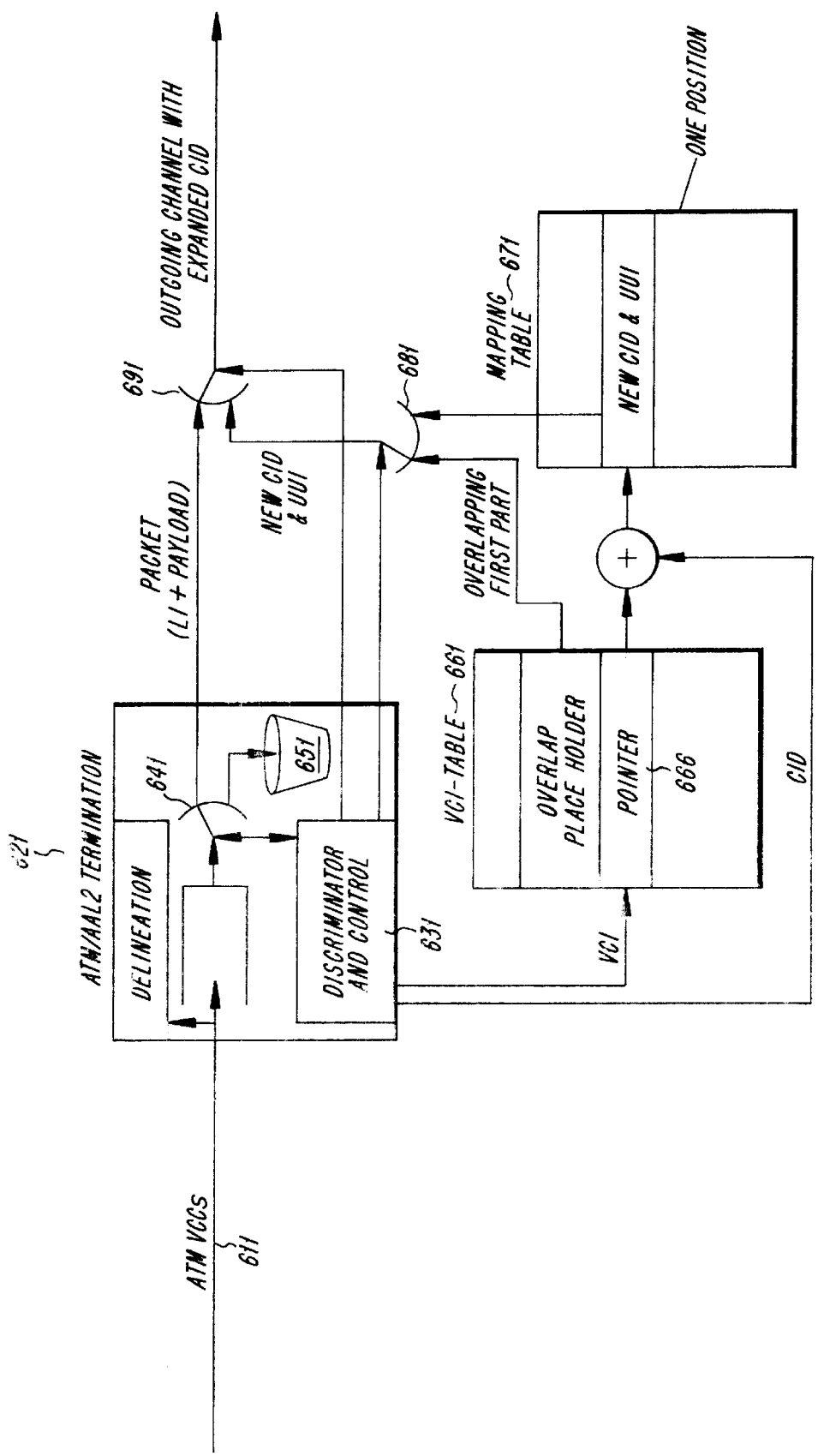
FIG. 6 illustrates an exemplary embodiment of the expander in the direction of incoming ATM VCCs to an outgoing channel with expanded CID, according to FIG. 4.

FIG. 6 illustrates an exemplary embodiment of the CID expansion described from the direction of incoming ATM VCCs 611 to an outgoing channel with expanded CID, according to FIG. 4.

The ATM/AAL2 termination entity 621 delineates the incoming ATM cells 611 and puts them in a first-in-first-out (FIFO) format. The basis for this delineation may be determined in accordance with the I.136.2 standard. The delineation includes functions to remove all information that is not part of the AAL2-CPS packets, such as, for example, padding. In the embodiment described, there is one FIFO. It is assumed that all ATM-VCCs carry AAL2 packets. If this is not the case, a selection process is needed prior to placing the ATM cells in FIFO for sending non-AAL2 ATM cells elsewhere. It is also assumed that every ATM-cell entering the FIFO is processed directly. The FIFO is very small and its contents may be placed in a processor memory where each incoming ATM-cell generates an interrupt. Thereafter, the FIFO may be located in a local memory.

The selection process is initiated by a discriminator 631 which controls a multiplexer 641. This discriminator may be set at a connection setup of the ATM-VCCs. Incoming ATM cells that do not carry AAL2-CPS packets targeted for the outgoing channel with expanded CID may be detected by examining their virtual channel indicator (VCI). Such cells are directed to a location 651 which indicates that cells on these connections are not being subjected to the "expanded CID" operation for the illustrated outgoing channel. These cells could very well belong to ATM connections going to other outgoing CID expansion channels or ATM connections that are not even carrying AAL2.

Figure 1:
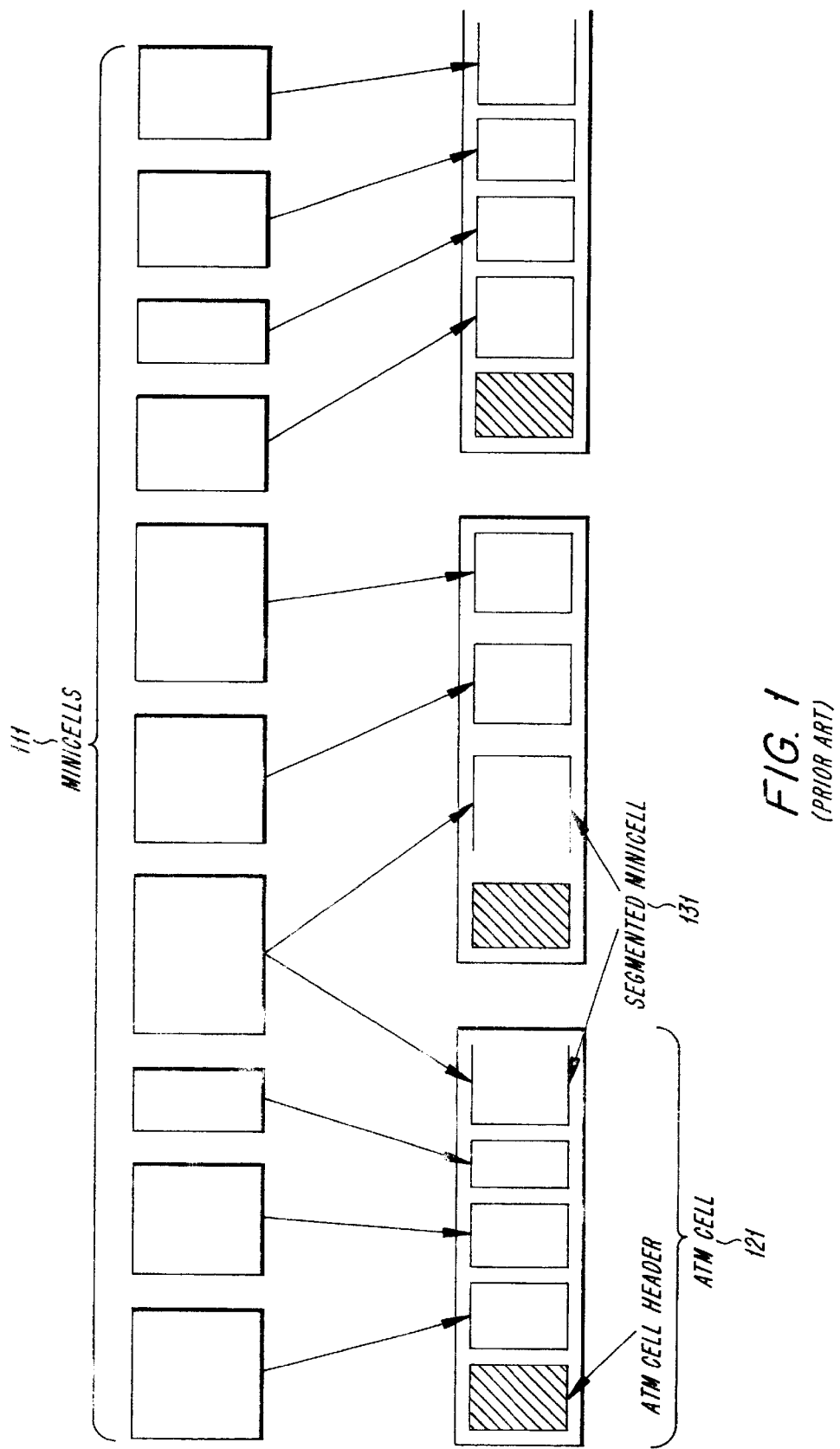
FIG. 1 illustrates a conventional arrangement of minicells within an ATM.
Figure 2:
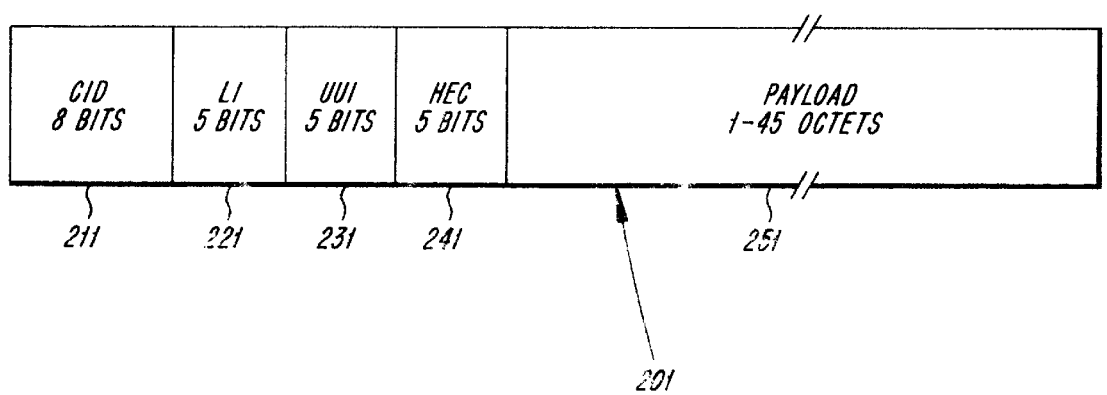
FIG. 2 illustrates an AAL2-CPS packet according to I.363.2.
Figure 3:
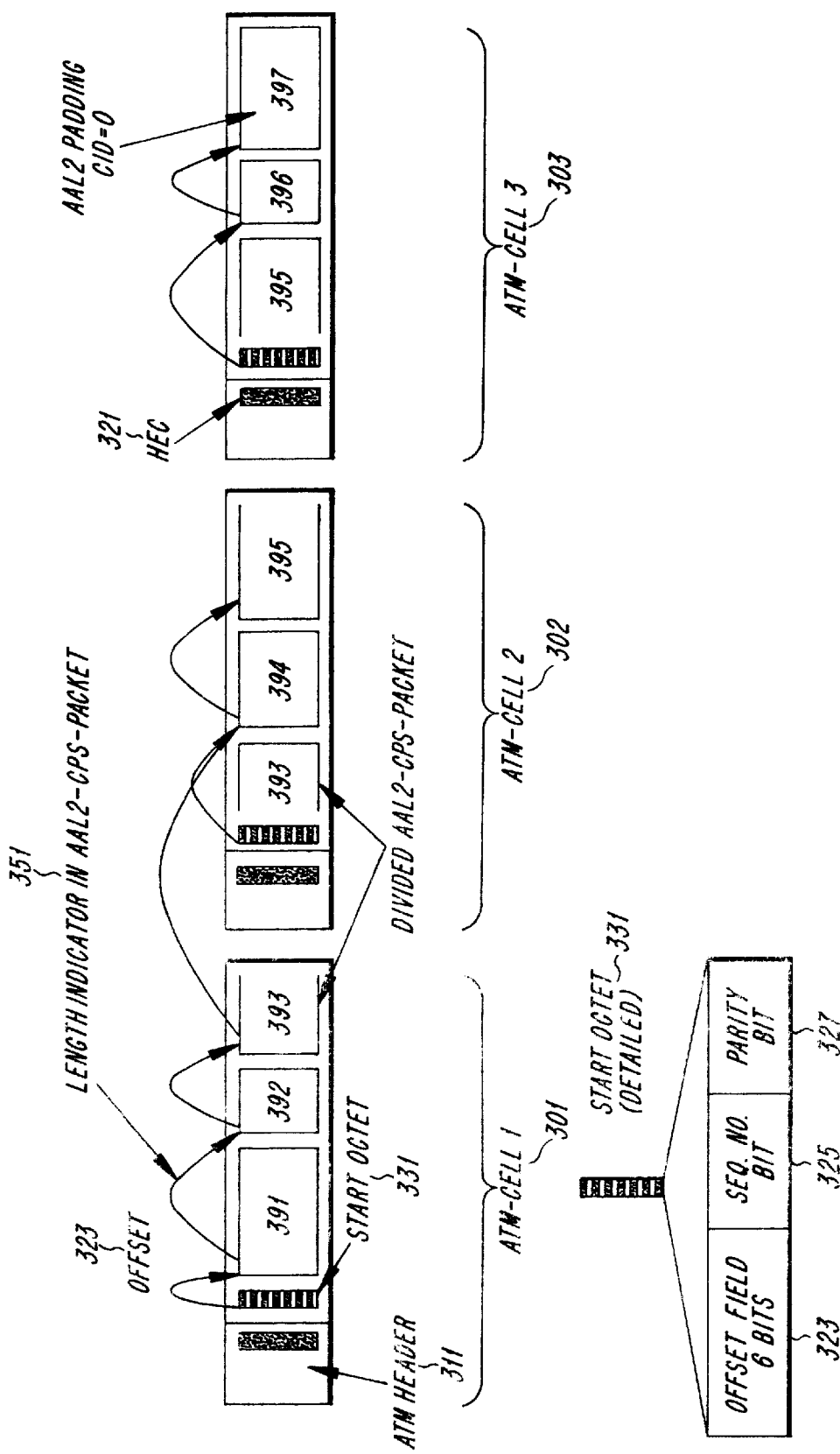
FIG. 3 illustrates a conventional AAL2 multiplexing technique with added resilience against loss of delineation in the form of a start octet.

The ATM cells belonging to the VCCs and subject to CID expansion initiate a control portion of the discriminator 631. The control portion of the discriminator 631, in addition to conventional AAL2-CPS packet termination capability described in I.363.2, also includes functionality for performing CID expansion. The control portion recalls the VCI and locates the CIDs by utilizing the offset 323 and LI 351 (of FIG. 3). The VCI is used to address a VCI table 661. The VCI table 661 contains a pointer 666 for each VCI that is subject to expansion. A VCI identifies the incoming VCC and the VCC signifies the entire connection across a network. In order to identify a VCC at a switching point, the VCI of the VCC is used. A VCI is associated with each ATM cell. All ATM cells that belong to a particular VCC have the same VCI. The VCI is unique for each link in the connection. A connection is established by concatenating links and establishing relations between assigned VCIs. That is, the VCI in the ATM cell is translated, in the switch, to the new value that is valid for that link. A particular VCC may have a VCI that changes from link to link. The pointer 666 is added to the CID that is associated with the incoming ATM-VCCs. The result of the pointer added to the CID now becomes the address that is pointed to in the mapping table 671. This address in the mapping table stores the new expanded CID value which may be considered as a combination of the old CID field and a UUI field. By using this method, one set of $CID_8$ to $CID_{255}$ may be assigned to $UUI_0$, another set to $UUI_1$, a third set to $UUI_2$ and so on until a last set is assigned to $UUI_{24}$. If less than 248 connections are used on an incoming VCC 611 that is mapped to a specific UUI code, such as, for example, if only a hundred CIDs are used on a VCC, then the UUI code could be shared by another VCC until the total number of all VCCs mapped to a UUI reaches two hundred and forty eight. In this manner, the outgoing channel with expanded CIDs 691 can be fully utilized according to exemplary embodiments of the present invention. By multiplexing twenty five VCCs each containing two hundred and forty connections, a total of over 6K connections may be realized regardless of the number of VCCs entering at 611. The VCI table 661 and mapping table 671 provide the means to fully and freely map incoming AAL2 connections on a multitude of VCCs at 611 to the outgoing channel 691 as long as the total number of AAL connections is less than the maximum number of connections.

In an alternative embodiment, the mapping table 671 may be omitted and the pointer 666 in the VCI table may replaced by the value of the UUI field. With this alternative approach, the CID remains constant and the value in the UUI field indicates the previous VCI in a compressed form. A compression is needed in most cases as only 26 UUI values are allowed (from 0–25 in binary form) and the VCIs can, in theory, be spread over an address space of 64 K. Normally, the VCIs are assigned starting with the lowest value. The first allowed VCI starts at bit 32. The ITU has reserved the first thirty two bits for other purposes. In a simplified exemplary table, the VCI in the incoming ATM-cell points directly with a 1:1 mapping to an entry in a local memory having the VCI table within the processor. The tables are configured locally at each of the transmitting and receiving ends. Each entry in the VCI table is 64 octets wide. Such width accommodates for the overlap area and UUI code which is used for expansion. The conversion of the VCI to UUI is assumed to be set up locally at each side of the link by an operator. The operator must ensure that conversion (as part of demultiplexing the multiplexed connections) from UUI to VCI at the receiving end matches the VCI to UUI conversion at the transmitted end. A second multiplexer 681 replaces the old CID values with the new expanded CID values from the mapping table.

The AAL2 standard permits the overlapping of AAL2-CPS packets between two ATM cells that belong to the same connection. To each entry in the VCI table, a place holder for the first part of an overlapping AAL2-CPS packet is added. The place holder is needed to store overlapping AAL2-CPS packets. The place holder must be at least 47 octets for each VCI. If the last AAL2-CPS packet in the ATM cell is overlapping, then it is stored in the place holder for the ATM connection in question. When the next ATM cell belonging to that connection appears, the stored first part is added to the outgoing stream by the multiplexer 691.

Figure 7:
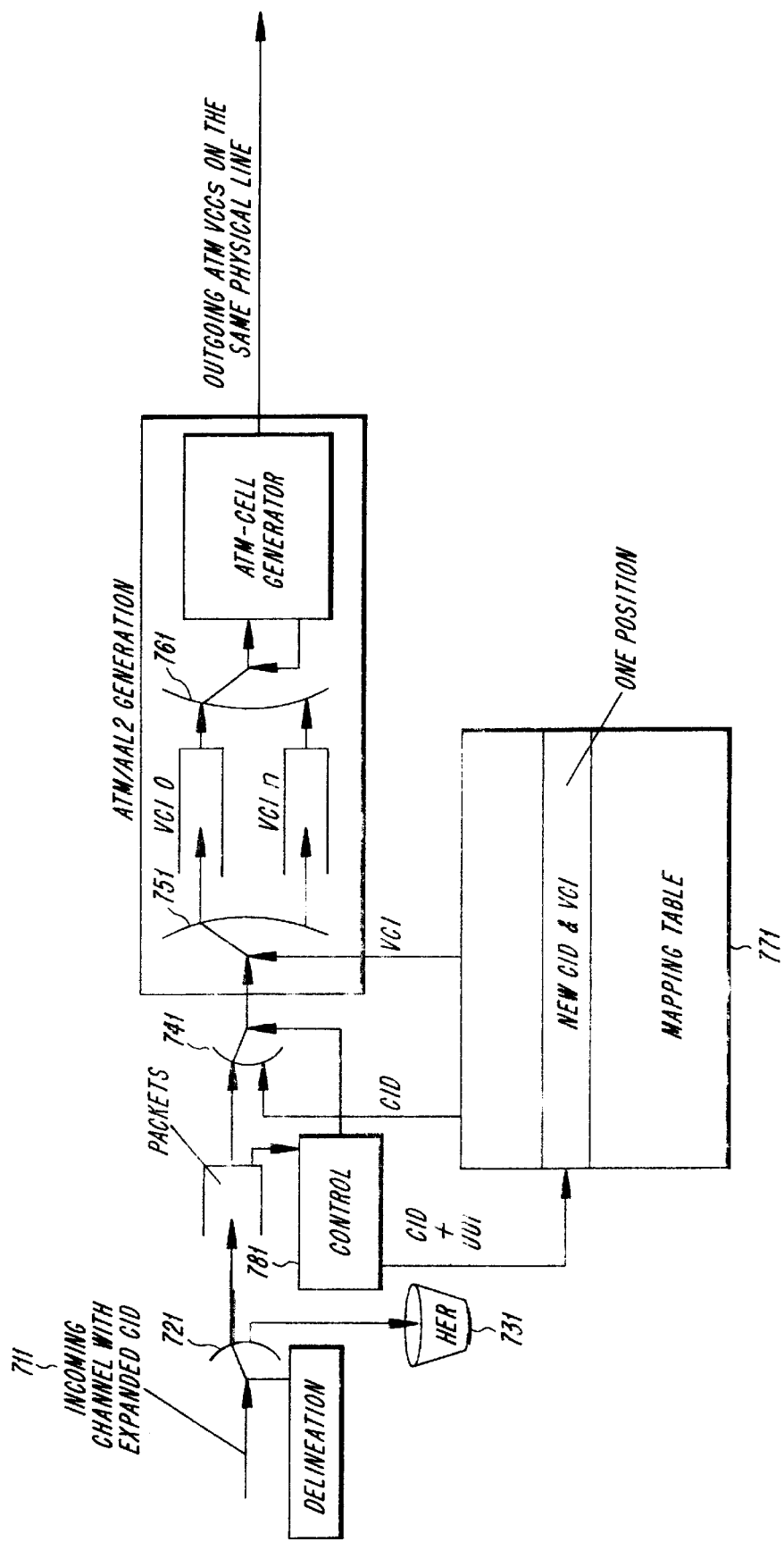
FIG. 7 illustrates another exemplary embodiment of the expander in the direction from an incoming channel with expanded CID to outgoing ATM VCCs, according to FIG. 4.

FIG. 7 illustrates an exemplary embodiment of the expander from the direction of an incoming channel with expanded CID to outgoing ATM VCCs, according to FIG. 4. This is the opposite process of the method described with respect to FIG. 6 above. At the incoming channel with expanded CID 711, a delineation takes place. The delineation is based on the channel structure. It could be a conventional ATM connection or one according to the fractional T1/E1 schemes. The delineation includes functions to remove all information that is not part of the AAL2-CPS packets, such as, for example, padding. The removed information is directed to location 731. If the AAL2-CPS packets are carried in ATM cells on incoming channel with expanded CID 711, the ATM headers are also removed. The AAL2-CPS packets are then put into a FIFO format and a control entity analysis is applied to AAL2-CPS packet header by control box 781 for keeping track of the AAL2-CPS packet boundaries in the FIFO. The control entity 781 extracts the CID and UUI values that are used to address a location in the mapping table. The control entity 781 also assists in assembling the header for the modified AAL2-CPS packet header using the multiplexer 741 prior to the packet entering the ATM/AAL2 generator 791. The new CID value is inserted in the header. In addition, though not illustrated in FIG. 7, a new UUI value can be used. The UUI value may be stored in the mapping table with the new CID. The new HEC is calculated based on the changed data in the header.

The boundaries of the minicell are determined by means of the LI in the header. The CID and UUI values are used to address a mapping table 771. Each combination of CID and UUI has its own entry in the table 771. The new CID and VCI are found in the table 771. In one embodiment, if the CID values remain constant, only one entry for each UUI that corresponds directly to the VCI is needed, i.e., a maximum of 26 entries.

The old CID is replaced with the CID obtained from the mapping table 771 by the second multiplexer 741. The VCC controls the third multiplexer 751 which routes the AAL2-CPS packets to a predefined FIFO according to VCC, as illustrated by $VCI_0$ to $VCI_N$. In one embodiment, the UUI could directly control the third multiplexer 751.

The FIFOs for each ATM connection and methods of generating assemblable ATM cells when sufficient AAL2-CPS packets exist in a FIFO or when a timer has expired are described in I.363.2.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of transmitting data in an asynchronous transfer mode (ATM) comprising the steps of:

packaging ATM data into a plurality of minicells under an ATM Adaptation Layer type 2 (AAL2) protocol, wherein each of said minicells comprises a connection identifier (CID) field and a user to user indication (UUI) field;

multiplexing a plurality of the minicells under AAL2 protocol into a virtual channel connection (VCC), wherein each of said multiplexed VCCs is identified by a virtual channel indicator (VCI); and multiplexing a plurality of said VCCs into a single channel, wherein each of the multiplexed VCCs is identified by an extended CID value which comprises a UUI value.

2. A method of transmitting data in an asynchronous transfer mode (ATM) comprising the steps of:

packaging the ATM data into a plurality of minicells under an ATM Adaptation Layer type 2 (AAL2) protocol wherein each minicell comprises a connection identifier (CID) field for identifying said minicell, a user to user indication (UUI) field, a length indication (LI) field and a header error control (HEC) field;

multiplexing a plurality of the minicells under AAL2 protocol into a plurality of virtual channel connections (VCCs) with each VCC being identified by a virtual channel indicator (VCI); and multiplexing a plurality of said VCCs into a single channel with each VCC being identified by an extended CID value which comprises a UUI value.

3. The method of claim 2 wherein the step of multiplexing VCCs further comprises the step of:

addressing a VCI table, using the VCI of the VCC being multiplexed, to obtain said UUI value.

4. The method of claim 3 further comprising the step of:

adding a place holder for a first part of an overlapping AAL2 packet to each entry of said VCI table.

5. The method of claim 4 further comprising the step of:

storing an overlapping packet of a cell in said place holder for later retrieval when a remaining portion of the overlapping cell is received.

6. The method of claim 2 wherein the step of multiplexing VCCs comprises the further steps of:

addressing a VCI table, using the VCI of the VCC being multiplexed, to obtain a pointer stored in the VCI table that corresponds to the VCC being multiplexed;

adding the pointer to the CID to determine an address location in a mapping table; and identifying the VCC using the value stored in the address location of the mapping table.

7. The method of claim 2 wherein the CID field is eight bits in length.

8. The method of claim 7 wherein CID field is used to identify up to 256 connections within each of said ATM-VCCs.

9. The method of claim 2 wherein the UUI field is five bits in length.

10. The method of claim 9 wherein the UUI field is used to identify up to 32 VCCs.

11. The method of claim 2 wherein said fields of the minicell occupy three octets and said payload occupies 45 octets.

12. The method of claim 11 wherein the first octet of the payload contains the offset field.

13. The method of claim 12 wherein said offset field contains a pointer for determining a first packet of each new minicell.

14. A method of demultiplexing a plurality of virtual channel connections (VCCs) into a plurality of minicells in an asynchronous transfer mode wherein the VCCs are multiplexed into a single channel and each VCC has a plurality of minicells multiplexed within, and wherein each of the minicells comprises a connection identifier (CID) field, a user to user indication (UUI) field and a length indication (LI) field, said method comprising the steps of:

determining boundaries of the minicells based on the contents of said LI field;

using an extended CID value from said CID field and said UUI field to address a mapping table containing a value corresponding to each set of said CID and UUI fields; and using the value obtained from said mapping table to determine a virtual channel indicator (VCI) associated with each minicell.

* * * * *